United States Patent

[11] 3,607,335

| [72] | Inventors | Horst Belde;<br>Ewald Daubach, both of Ludwigshafen, Germany |
|---|---|---|
| [21] | Appl. No. | 772,808 |
| [22] | Filed | Nov. 1, 1968 |
| [45] | Patented | Sept. 21, 1971 |
| [73] | Assignee | Badische Anilin- & Soda-Fabrik Aktiengesellschaft<br>Ludwigshafen am Rhine, Germany |
| [32] | Priority | Nov. 8, 1967, Mar. 23, 1968 |
| [33] | | Germany |
| [31] | | P 16 69 737.3 and P 17 69 034.5 |

[54] PIGMENT FORMULATIONS
8 Claims, No Drawings

[52] U.S. Cl. .................................................. 106/288 Q, 106/308 Q, 260/40
[51] Int. Cl. ................................................. C08h 17/02, C08g 51/02
[50] Field of Search ............................................. 106/288 Q, 300, 307, 308 Q; 260/40, 475

[56] References Cited
UNITED STATES PATENTS

| 3,004,858 | 10/1961 | Sheehan et al. ............... | 106/300 |
| 3,377,262 | 4/1968 | Karickhoff et al. ............ | 204/165 |

FOREIGN PATENTS

| 610,137 | 10/1948 | Great Britain ................ | 106/308 |

*Primary Examiner*—Tobias E. Levow
*Assistant Examiner*—J. V. Howard
*Attorney*—Johnston, Root, O'Keeffe, Keil, Thompson & Shurtleff ABSTRACT: Pigment formulations which contain the pigment dye finally dispersed in diglycol terephthalates or linear oligomers of terephthalic acid and ethylene glycol are outstandingly suitable for mass coloration of thermoplastics.

PIGMENT FORMULATIONS

Pigment formulations which uniformly dye plastics filaments and threads and do not detrimentally affect their mechanical properties are required for mass dyeing of thermoplastics, particularly for spin dyeing of polyesters. Since these requirements have not been completely fulfilled by prior art pigment formulations, the problem remains of preparing such advantageous pigment formulations.

Pigment formulations according to the present invention, which have the desired properties to a great extent, contain: *a.* 15% to 75% by weight of a pigment dye; *b.* 25% to 85% by weight of a diglycol terephthalate or a linear oligomer of terephthalic acid and ethylene glycol or a mixture containing such oligomers which has been obtained by transesterification of dimethyl terephthalate with ethylene glycol; and *c.* 0 to 20% by weight of a surfactant.

These new advantageous pigment formulations are suitable for mass coloration of thermoplastics such as polyamides, polyolefins and particularly polyesters.

The new pigment formulations may contain, as pigment dyes, both inorganic pigments such as titanium dioxide, carbon black and iron oxide, and organic pigments, for example phthalocyanine dyes such as halogen-free and halogen-containing copper phthalocyanines, quinacridones, perylene—3,4,9,10—tetracarboxylic acid derivatives, anthraquinone derivatives such as indanthrone, or pigment dyes of the azo series. The pigment formulations preferably contain pigment dyes of the said types which have a high thermal resistance.

The new pigment formulations contain the pigment dyes finely dispersed in diglycol terephthalate, in linear oligomers of terephthalic acid and ethylene glycol or in a mixture containing such oligomers which has been obtained by transesterification of dimethyl terephthalate with ethylene glycol, for example prepared by a conventional method starting from a molar ratio of dimethyl terephthalate to ethylene glycol of from 1:1.3 to 1:3. The degree of condensation of the said oligomers or mixture containing oligomers preferably does not exceed the value 10 and is preferably from 1 to 3. A mixture of the said type prepared by transesterification of dimethyl terephthalate with ethylene glycol may have for example the composition: less than 0.01% by weight of dimethyl terephthalate, 2% to 7% by weight of ethylene glycol, 0.3% to 1.5% by weight of methyl glycol terephthalate, 9% to 27% by weight of diglycol terephthalate and 65% to 85% by weight of oligomers. The saponification number of such a mixture is within the range of values from 400 to 550.

The pigment formulations may also contain up to 20% by weight of one or more surfactants. Examples of surfactants are dispersants conventionally used for the preparation of pigment formulations. These may be ionic (cationic or anionic) or nonionic. Examples are: salts of long chain fatty acids such as zinc stearate, salts of condensation products of 2—naphthalenesulfonic acid and formaldehyde, alkyl sulfonates, alkylaryl sulfonates, oxethylation products of alcohols, phenols, amines, carboxylic acids such as adducts of ethylene oxide to colophony, oleic acid or spermo oil alcohols and also polyethylene oxide and polypropylene oxide.

The new pigment formulations may be prepared advantageously by mixing a mixture of 15% to 75% by weight of a pigment dye, 25% to 85% by weight of diglycol terephthalate or a linear oligomer or mixture of oligomers of the said type and 0 to 20% by weight of surfactant which may additionally contain up to 70% (with reference to the mixture) of water and/or solvent, at a temperature of from 60° to 140° C., preferably 80° to 110° C., under the action of shear forces to form a uniformly colored mixture, any water and/or solvent present being distilled off and grinding the colored mixture to a powder. Organic solvents which boil below 170° C. and are inert to diglycol terephthalate at temperatures up to 140° C. are especially suitable as solvents. Examples are: dimethylformamide monohydric or polyhydric alcohols such as methanol, ethanol and propanol, or esters such as methyl acetate, ethyl acetate and propyl acetate.

The pigment dyes may be used for the production of the pigment formulations in dry form, as aqueous pressed material as formed in the synthesis or in dispersed form for example in a pigment form containing a surfactant of the type specified above. Mixing of the constituents to a uniformly colored mixture is carried out under the action of shear forces, advantageously in a kneader. When the pigment dye is used in the form of aqueous pressed material it is advantageous to place the oligomer of the specific type, with or without the surfactant, in a kneader and to add the pressed material to the kneader in portions. Water and any solvent present are distilled off during kneading. It is advantageous to use a vacuum kneader in this method.

The time required for mixing in the kneader may vary from 1 to 4 hours. Uniform coloration throughout the mixture and the necessary fine dispersion of the dye may be determined for example by microscopic inspection. The dispersion of the pigment should be uniform and the particle size should be 1 or advantageously less than 1 micron.

Those new pigment formulations are preferred which have a content of 20% to 60% by weight of a pigment dye, 40% to 80% by weight of diglycol terephthalate or the said oligomers or oligomer mixtures and 0.5% to 20.0% by weight of a surfactant.

Pigment formulations according to the invention may be used for mass coloration of thermoplastics such as polyamides, polyolefins or polyesters. Particularly advantageous results are obtained in the mass coloration of polyesters. Thus for example the pigment formulations, when used in the spin dyeing of polyesters, give uniformly colored filaments or threads which contain the pigment dye in homogeneous distribution and which are not detrimentally changed in their mechanical properties.

The invention is illustrated in the following Examples. The parts and percentages specified in the Examples are by weight.

EXAMPLE 1

150 parts of an aqueous pressed material of copper phtalocyanine having a dye content of 20% is stirred with 0.3 parts of zinc stearate and 0.1 part of the sodium salt of the condensation product of 2—naphthalenesulfonic acid and formaldehyde and dried. The dried mixture with an addition of 6 parts of dimethylformamide is kneaded with 69.6 parts of diglycol terephthalate at about 90° to 100° C. in a kneader for 2 hours. The mixture is then rolled and ground to a powder. A pigment formulation is obtained. When used for spin dyeing polyesters, using for example 4% of the pigment formulation with reference to the spinning solution, bright and uniformly dyed blue filaments or threads are obtained in which the pigment is homogeneously distributed.

EXAMPLE 2

150 parts of the pressed material specified in Example 1 is dispersed in the conventional way with 3 parts of the sodium salt for the condensation product of 2—naphthalenesulfonic acid and formaldehyde. The paste obtained is kneaded for 2 hours with 67 parts of diglycol terephthalate in a vacuum kneader at a pressure of about 400 torr and at about 90° to 100° C., the aqueous pigment paste being added in portions while distilling off water. The mixture is then ground to a powdered pigment formulation.

A similar pigment formulation is obtained by using 3 parts of the reaction product of 1 mole of oleic acid and 6 moles of ethylene oxide as the surfactant.

EXAMPLE 3

150 parts of 20% aqueous pressed material of the dye indanthrone is kneaded without further additions with 70 parts of diglycol terephthalate in a vacuum kneader at a pressure of about 400 torr and at 90° to 100° C. while distilling off water. The mixture is then rolled and ground to a powder. When used in the spin dyeing of polyesters, the pigment formulation gives bright blue shades with homogeneous pigment distribution.

EXAMPLE 4

67 parts of diglycol terephthalate is fused in a kneader with 3 parts of the reaction product of 1 mole of oleic acid and 6 moles of ethylene oxide.

30 parts of a halocopper phthalocyanine is introduced into this melt. The mixture is kneaded at about 90° to 100° C. for three hours. When used in spin dyeing polyesters, the mixture gives bright green shades with homogeneous pigment distribution.

EXAMPLE 5

50 parts of titanium dioxide is kneaded with 50 parts of a transesterification product obtainable from dimethyl terephthalate and ethylene glycol and having a degree of condensation of 1.2 in a kneader for 2 hours at 80° to 100° C. The kneaded mixture obtained is rolled and ground. A pigment formulation is obtained which is suitable for pigmenting polyester material by a batchwise or continuous method. The pigment dyeings are distinguished by a homogeneous distribution of the dye.

EXAMPLE 6

50 parts of titanium dioxide, 47.5 parts of a transesterification product having a degree of condensation of 1.2 and obtained from dimethyl terephthalate and ethylene glycol are processed with 2.5 parts of zinc stearate in the manner described in Example 5. A pigment formulation is obtained which is eminently suitable for coloring thermoplastics.

EXAMPLE 7

70 parts of titanium dioxide, 20 parts of a transesterification product having a degree of condensation of 3.0 (obtainable from dimethyl terephthalate and ethylene glycol) and 10 parts of a polyethylene oxide having a molecular weight of about 3,000 to 5,000 is processed into a pigment formulation in the manner described in Example 5.

EXAMPLE 8

50 parts of copper phthalocyanine blue of the β-modification, 35 parts of a transesterification product having a degree of condensation of 2.5 (obtainable from dimethyl terephthalate and ethylene glycol) and 15 parts of the sodium salt of the sulfonated reaction product of 1 mole of octylphenol and 50 moles of ethylene oxide are processed into a pigment formulation in the manner described in Example 5.

We claim:

1. A solid pulverulent pigment formulation containing:
   a. 15% to 75% by weight of a pigment dye; and
   b. 25% to 85% by weight of diglycol terephthalate, a linear oligomer of terephthalic acid and ethylene glycol with a degree of condensation not exceeding a value of 10 or mixtures of such oligomers prepared by transesterification of dimethyl terephthalate with ethylene glycol.

2. A solid pulverulent pigment formulation as claimed in claim 1 which further contains:
   c. up to 20% by weight of a surfactant.

3. A solid pulverulent pigment formulation as claimed in claim 2 wherein component (b) has a degree of condensation of from 1 to 3.

4. A solid pulverulent pigment formulation as claimed in claim 1 containing 20% to 60% by weight of component (a), 40% to 80% by weight of component (b) and 0.5% to 20% by weight of a surfactant (c).

5. A solid pulverulent pigment formulation as claimed in claim 4 wherein component (b) has a degree of condensation of from 1 to 3.

6. A solid pulverulent pigment formulation containing:
   a. 15% to 75% by weight of a pigment dye;
   b. 25% to 85% by weight of a condensate mixture prepared by transesterification of dimethyl terephthalate with ethylene glycol and containing less than 0.01% by weight of dimethyl terephthalate, 2% to 7% percent by weight of ethylene glycol, 0.3% to 1.5% by weight of methyl glycol terephthalate, 9% to 27% by weight of diglycol terephthalate and 65% to 85% by weight of linear oligomers of terephthalic acid and ethylene glycol, said condensate mixture having a saponification number of from 400 to 550 and a degree of condensation not exceeding a value of 10; and
   c. 0% to 20% by weight of a surfactant.

7. A solid pulverulent pigment formulation as claimed in claim 6 containing as component (c) about 0.5% to 20% by weight of a polyethylene oxide having a molecular weight of from 3,000 to 5,000.

8. A solid pulverulent pigment formulation as claimed in claim 6 wherein the condensate mixture (b) has a degree of condensation of from 1 to 3.